(12) United States Patent
Kalous

(10) Patent No.: US 8,707,745 B2
(45) Date of Patent: Apr. 29, 2014

(54) TAILGATE LOCK

(75) Inventor: D. Scott Kalous, Kenosha, WI (US)

(73) Assignee: Master Lock Company LLC, Oak Creek, WI (US)

(*) Notice: Subject to any disclaimer, the term of this patent is extended or adjusted under 35 U.S.C. 154(b) by 93 days.

(21) Appl. No.: 13/286,297

(22) Filed: Nov. 1, 2011

(65) Prior Publication Data
US 2012/0103033 A1 May 3, 2012

Related U.S. Application Data

(60) Provisional application No. 61/408,812, filed on Nov. 1, 2010.

(51) Int. Cl.
B65D 55/14 (2006.01)
E05B 73/00 (2006.01)
E05B 65/12 (2006.01)
E05B 27/00 (2006.01)
E05B 67/06 (2006.01)
B60D 1/60 (2006.01)

(52) U.S. Cl.
USPC .......... 70/164; 70/14; 70/258; 70/360; 70/53; 280/507

(58) Field of Classification Search
USPC ......... 70/14, 33, 258, 360, 15, 38 A, 53, 164; 280/507
See application file for complete search history.

(56) References Cited

U.S. PATENT DOCUMENTS

| 145,864 | A | 12/1873 | Hall |
| 153,673 | A | 8/1874 | Fox |
| 180,875 | A | 8/1876 | Hawkins |
| 226,069 | A | 3/1880 | Hathaway |
| 241,279 | A | 5/1881 | Barth |
| 288,559 | A | 11/1883 | Ekl et al. |
| 339,214 | A | 4/1886 | Roberts |
| 396,960 | A | 1/1889 | Sise |
| 417,602 | A | 12/1889 | Straubinger |

(Continued)

FOREIGN PATENT DOCUMENTS

GB 2222433 7/1990

OTHER PUBLICATIONS

International Search Report and Written Opinion for International Application No. PCT/US2011/058703, date of mailing Mar. 19, 2012.

Primary Examiner — Christopher Boswell
Assistant Examiner — Eric Kurilla
(74) Attorney, Agent, or Firm — Calfee, Halter & Griswold LLP

(57) ABSTRACT

A lock includes a lock body, a lock bar, and a locking mechanism. The lock body extends in a longitudinal direction between a first end defining a longitudinal passage and a second end. The lock bar is disposed within the passage and movable in a longitudinal direction between a securing position proximal to the second end and a release position distal to the second end, with a proximal end portion of the lock bar and the second end defining a first gap when the lock bar is in the release position. The locking mechanism is assembled within one of the lock body and the lock bar and is operable between a locking condition securing the lock bar against movement from the securing position to the release position, and an unlocked condition permitting movement of the lock bar from the securing position to the release position.

19 Claims, 8 Drawing Sheets

(56) References Cited

U.S. PATENT DOCUMENTS

| | | | | |
|---|---|---|---|---|
| 552,340 | A | 12/1895 | Tyack | |
| 558,981 | A | 4/1896 | Poe et al. | |
| 564,498 | A | 7/1896 | Bagot | |
| 574,961 | A | 12/1897 | Troast | |
| 598,203 | A * | 2/1898 | Johnson | 70/14 |
| 614,312 | A | 11/1898 | Voight | |
| 621,391 | A | 3/1899 | Turner | |
| 645,071 | A | 3/1900 | Conlan | |
| 647,408 | A | 4/1900 | Houts | |
| 669,295 | A | 3/1901 | Wendel | |
| 672,174 | A | 4/1901 | Leonard | |
| 707,676 | A | 8/1902 | Coughlen | |
| 717,867 | A | 1/1903 | King | |
| 853,368 | A | 5/1907 | Mills | |
| 903,680 | A | 11/1908 | Cowie | |
| 1,021,456 | A | 3/1912 | Evans | |
| 1,338,131 | A | 4/1920 | Hendricks | |
| 1,343,870 | A | 6/1920 | James | |
| 1,363,599 | A * | 12/1920 | Hull et al. | 70/33 |
| 1,423,840 | A | 7/1922 | Durbin | |
| 1,477,777 | A | 12/1923 | Shek | |
| 1,482,515 | A | 2/1924 | Hainline | |
| 1,499,960 | A | 7/1924 | Almedia | |
| 1,530,177 | A | 3/1925 | Heyer | |
| 1,542,442 | A | 6/1925 | Fraim | |
| 1,707,266 | A | 4/1929 | Hillborn | |
| 1,777,424 | A | 10/1930 | Atkins | |
| 1,920,521 | A * | 8/1933 | Patterson | 70/19 |
| 2,022,886 | A | 12/1935 | Jett et al. | |
| 2,144,837 | A | 1/1939 | Douglas | |
| 2,157,555 | A | 5/1939 | McInturff | |
| 2,166,860 | A | 7/1939 | Davis | |
| 2,463,195 | A | 3/1949 | Mungan | |
| 2,478,339 | A | 8/1949 | Sullivan | |
| 2,508,302 | A | 5/1950 | Stue | |
| 2,697,929 | A | 12/1954 | Morgan | |
| 2,700,289 | A | 1/1955 | Morgan | |
| 2,709,356 | A | 5/1955 | Bristow | |
| 2,924,960 | A | 2/1960 | Palazzo | |
| 2,955,453 | A | 10/1960 | Mitchell | |
| 2,983,133 | A | 5/1961 | Hruby | |
| 3,269,159 | A * | 8/1966 | Young | 70/232 |
| 3,297,333 | A | 1/1967 | Schwedt et al. | |
| 3,406,544 | A | 10/1968 | Schreiber | |
| 3,475,931 | A | 11/1969 | Foote | |
| 3,759,076 | A | 9/1973 | Reese | |
| 3,826,114 | A * | 7/1974 | Emerson | 70/14 |
| 3,844,146 | A | 10/1974 | Fouces et al. | |
| 4,258,559 | A | 3/1981 | Linn | |
| 4,426,861 | A | 1/1984 | Chillis | |
| 4,901,543 | A | 2/1990 | Appelbaum | |
| 4,912,949 | A | 4/1990 | Bowers | |
| 4,918,951 | A | 4/1990 | Kavizky | |
| 5,087,090 | A * | 2/1992 | Humphrey et al. | 292/359 |
| 5,367,785 | A | 11/1994 | Benarroch | |
| 5,377,510 | A | 1/1995 | Smith | |
| 5,406,811 | A | 4/1995 | Nakai | |
| 5,415,058 | A | 5/1995 | Young et al. | |
| 5,417,092 | A | 5/1995 | Iu | |
| 5,433,092 | A | 7/1995 | Kuo | |
| 5,515,947 | A | 5/1996 | Shieh | |
| 5,537,846 | A | 7/1996 | Simon | |
| 5,638,710 | A | 6/1997 | Howard, Jr. et al. | |
| 5,694,797 | A | 12/1997 | Kuo | |
| 5,819,561 | A | 10/1998 | Blehi, III | |
| 5,823,021 | A | 10/1998 | Chang | |
| 5,823,022 | A | 10/1998 | Barker | |
| 5,873,271 | A | 2/1999 | Smith | |
| 6,161,402 | A | 12/2000 | Moore | |
| 6,378,343 | B1 | 4/2002 | Lee | |
| 6,382,002 | B1 | 5/2002 | Chen | |
| 6,393,874 | B1 | 5/2002 | Zapushek et al. | |
| 6,519,983 | B2 | 2/2003 | Witchey | |
| 6,564,599 | B2 | 5/2003 | Eagleson et al. | |
| 6,575,001 | B1 | 6/2003 | Simon et al. | |
| 6,666,051 | B1 | 12/2003 | Li | |
| 6,694,781 | B1 | 2/2004 | Li | |
| 6,698,256 | B2 | 3/2004 | Witchey | |
| 6,718,802 | B2 | 4/2004 | Vito | |
| 6,766,674 | B2 | 7/2004 | Simon | |
| D499,953 | S | 12/2004 | Haggard | |
| 6,889,995 | B2 * | 5/2005 | Staggs | 280/507 |
| 6,896,232 | B2 * | 5/2005 | Crowell et al. | 248/316.4 |
| D515,416 | S | 2/2006 | Haggard et al. | |
| D515,417 | S | 2/2006 | Haggard | |
| 7,047,771 | B2 | 5/2006 | Tanos | |
| 7,121,121 | B2 | 10/2006 | Wyers | |
| 7,251,969 | B2 | 8/2007 | Simon | |
| 7,316,135 | B2 * | 1/2008 | Parsons | 70/16 |
| 7,353,671 | B2 | 4/2008 | Recknagel et al. | |
| 7,377,135 | B2 | 5/2008 | Copus | |
| 7,448,236 | B2 | 11/2008 | Recknagel et al. | |
| 7,469,919 | B2 | 12/2008 | Kalous et al. | |
| 7,614,267 | B2 | 11/2009 | Simon | |
| 7,661,280 | B1 * | 2/2010 | Weyland | 70/233 |
| 2004/0163432 | A1 | 8/2004 | Atthaprasith | |
| 2004/0168489 | A1 | 9/2004 | Simon et al. | |
| 2005/0039498 | A1 | 2/2005 | Budge | |
| 2007/0144222 | A1 | 6/2007 | Wyers | |
| 2008/0163653 | A1 | 7/2008 | Anderson | |
| 2009/0079163 | A1 | 3/2009 | Cuellar et al. | |
| 2010/0095717 | A9 | 4/2010 | Wyers | |

* cited by examiner

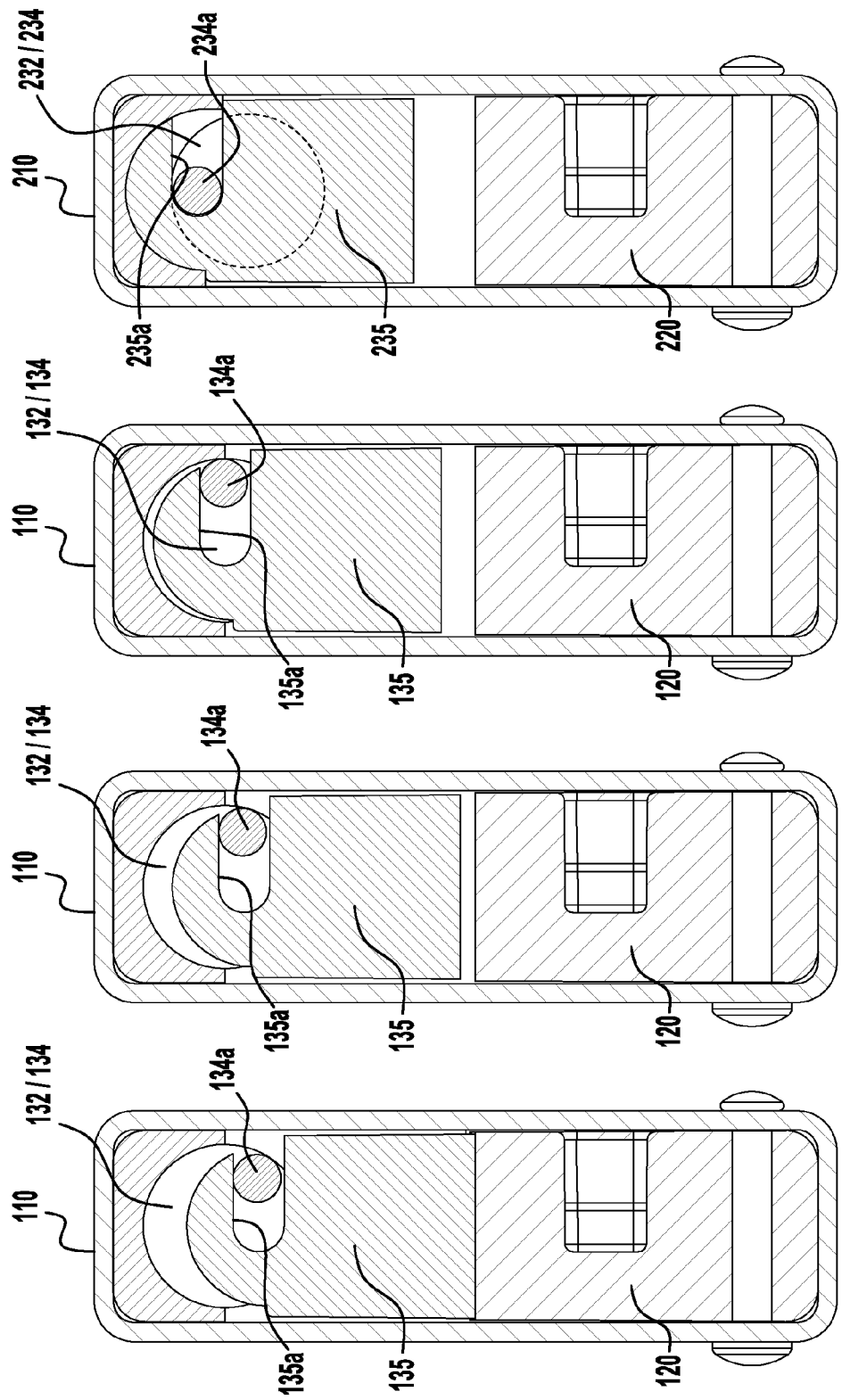

TAILGATE LOCK

CROSS-REFERENCE TO RELATED APPLICATION

This application claims the benefit of U.S. Provisional Patent Application Ser. No. 61/408,812, entitled "TAILGATE LOCK" and filed Nov. 1, 2010, the entire contents of which are incorporated herein by reference, to the extent that they are not conflicting with the present application.

BACKGROUND

The tailgate of a conventional pickup truck is generally adapted for easy removal, for example, to facilitate the removal and loading of the contents of the truck bed. In a common arrangement, as shown in FIG. 1, a tailgate 10 is provided with a C-shaped hinge cup or hollow axle 12 that surrounds an oblong or flatted shaft 16 secured to the truck body 15, allowing the tailgate 10 to pivot about the shaft 16. When the tailgate 10 is pivoted to a releasing orientation, the shaft 16 aligns with a slot or opening 13 in the hollow axle 12, allowing the axle 12 to be pulled free from the shaft 16 for removal of the tailgate 10 from the truck body 15. While this arrangement provides for quick and easy detachment of the tailgate, the arrangement also presents a risk of theft of a tailgate that has not been locked in the closed (i.e., vertical) position.

SUMMARY

The present application describes locks that may be used, for example, with a tailgate hollow axle and interlocking shaft of a truck body, to prevent unauthorized removal of a tailgate from a truck. The present application also describes ratcheting locks that permit advancement of a ratcheted locking member only when an authorized key is inserted in a key cylinder locking mechanism of the ratcheting lock.

Accordingly, in one exemplary embodiment, a lock includes a lock body, a lock bar, and a locking mechanism. The lock body extends in a longitudinal direction between a first end defining a longitudinal passage and a second end. The lock bar is disposed within the passage and movable in a longitudinal direction between a securing position proximal to the second end and a release position distal to the second, with a proximal end portion of the lock bar and the second end defining a first gap when the lock bar is in the release position. The locking mechanism is assembled within one of the lock body and the lock bar and is operable between a locking condition securing the lock bar against movement from the securing position to the release position, and an unlocked condition permitting movement of the lock bar from the securing position to the release position.

According to another exemplary aspect of the present application, a method of securing a tailgate to a pivot shaft extending from an inner wall of a pickup truck is contemplated. In one exemplary method, a lock is provided with a lock body having a retaining portion, a lock bar slideably disposed within a passage in the lock body, and a locking mechanism assembled within one of the lock body and the lock bar, with the lock bar being in a releasing position in which a proximal end of the lock bar and the lock body retaining portion define a first gap sized to receive a hollow axle of the tailgate therethrough. The lock is aligned between the tailgate and the pickup truck inner wall, and the cup is received through the first gap. The lock bar is slid to a securing position proximate the retaining portion, such that the hollow axle and pivot shaft are captured between the lock body and the lock bar. The locking mechanism is operated to secure the lock bar in the securing position.

In another exemplary embodiment, a ratcheting lock includes a lock body, a locking member slideably disposed in a passage in the lock body, and a locking mechanism disposed within one of the lock body and the locking member. The locking mechanism includes a ratchet member engageable with a ratchet surface disposed on the other of the lock body and the locking member to secure the locking member in any one of a plurality of incremental securing positions relative to the lock body. The locking mechanism further includes a key cylinder rotatable between a locked position and an unlocked position when an authorized key is inserted in the key cylinder. The key cylinder moves the ratchet member out of engagement with the ratchet surface when the key cylinder is rotated to the unlocked position. When the key cylinder is in the locked position and an authorized key is inserted in the key cylinder, a force applied to the locking member in a first direction rotates the key cylinder to a ratcheting position between the locked position and the unlocked position to disengage the ratchet member from the ratchet surface to permit movement of the locking member in the first direction, with the locking member remaining secured against user movement in a second direction opposite the first direction.

BRIEF DESCRIPTION OF THE DRAWINGS

Further features and advantages of the invention will become apparent from the following detailed description made with reference to the accompanying drawings, wherein:

FIG. 3A is a cross-sectional end view of the tailgate lock of FIG. 2, shown with the key cylinder plug in a locked position;

FIG. 3B is a cross-sectional end view of the tailgate lock of FIG. 2, shown with the key cylinder plug in a ratcheting position;

FIG. 3C is a cross-sectional end view of the tailgate lock of FIG. 2, shown with the key cylinder plug in an unlocked position;

FIG. 3D is a cross-sectional end view of another exemplary tailgate lock, shown with the key cylinder plug in a retained unlocked position;

DETAILED DESCRIPTION

Figure 1:
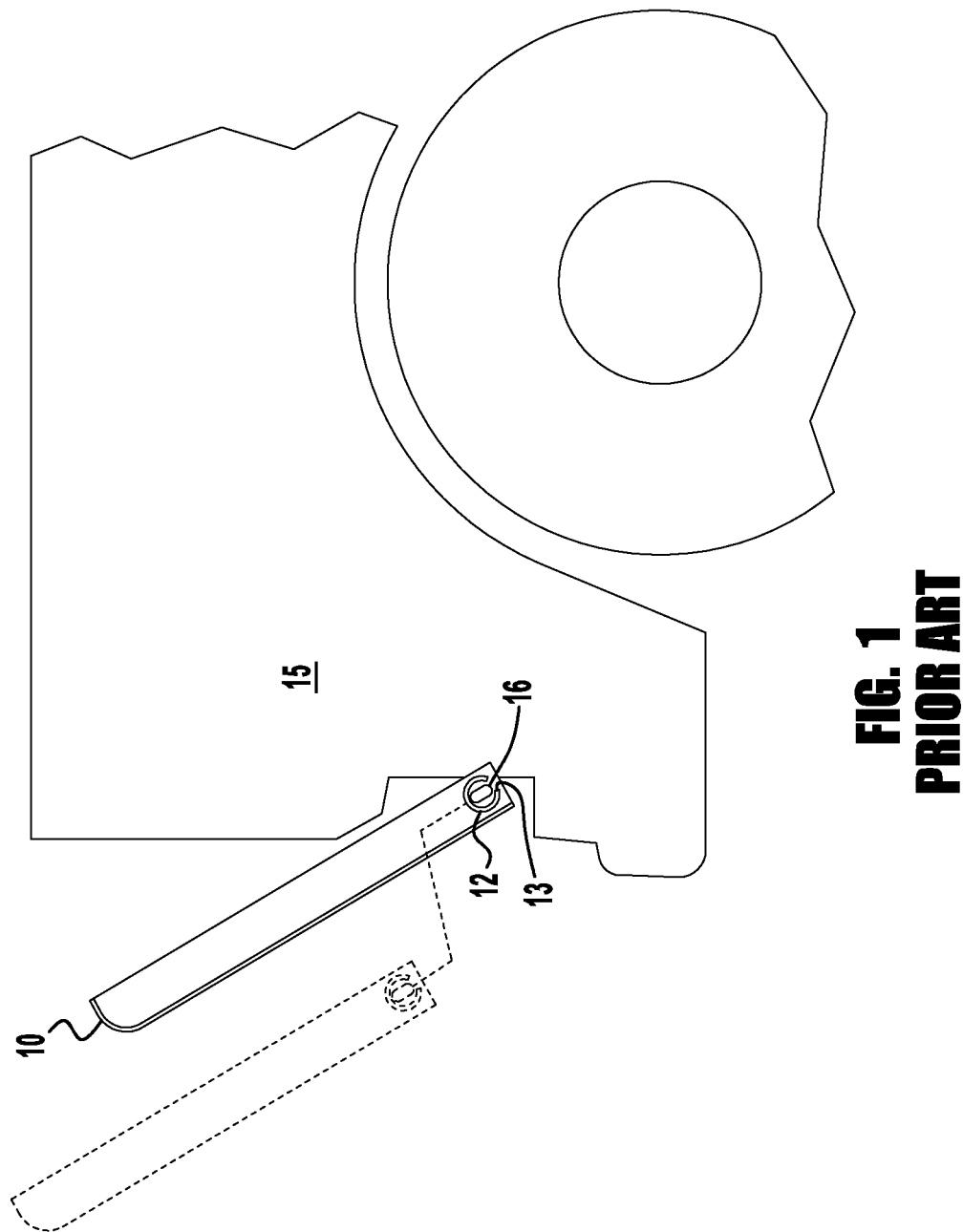
FIG. 1 is a side schematic view of a truck and tailgate arrangement.
Figure 2:
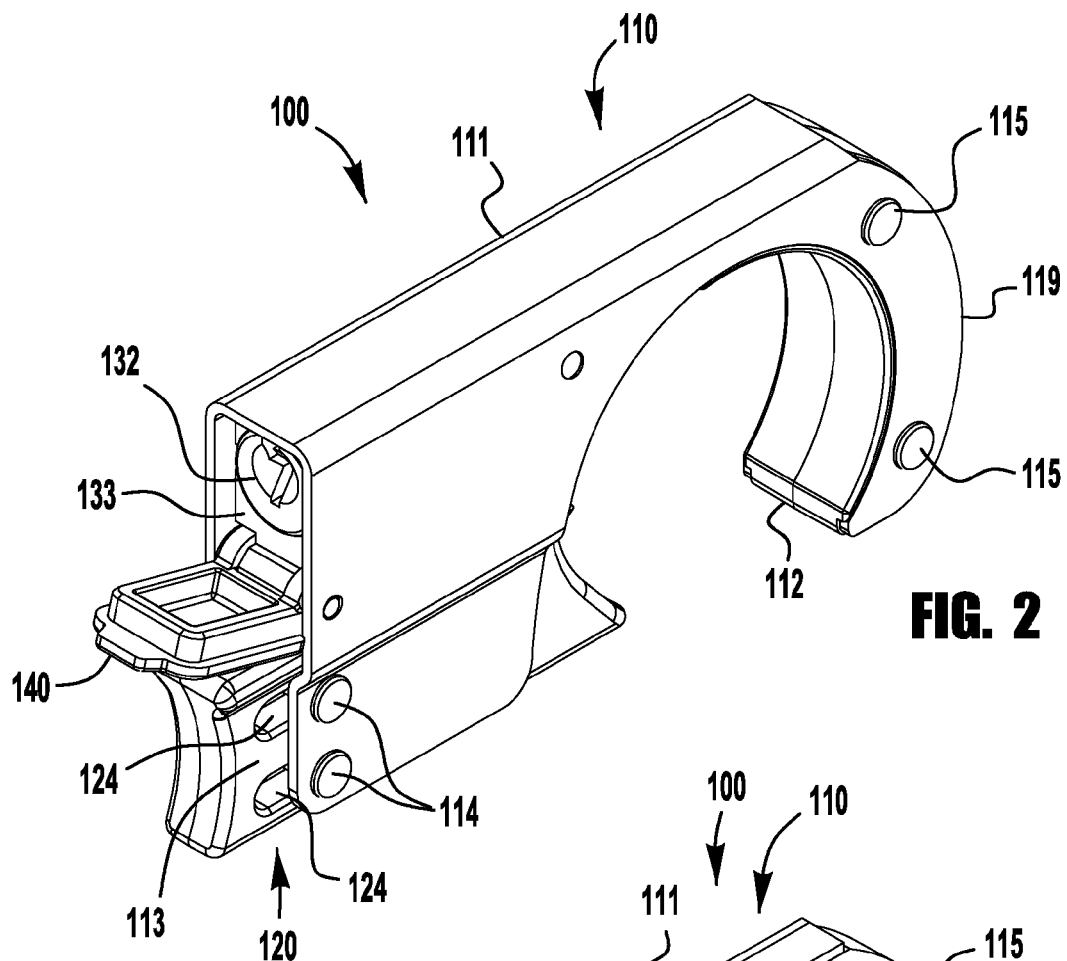
FIG. 2 is a perspective view of an exemplary tailgate lock.
Figure 3:
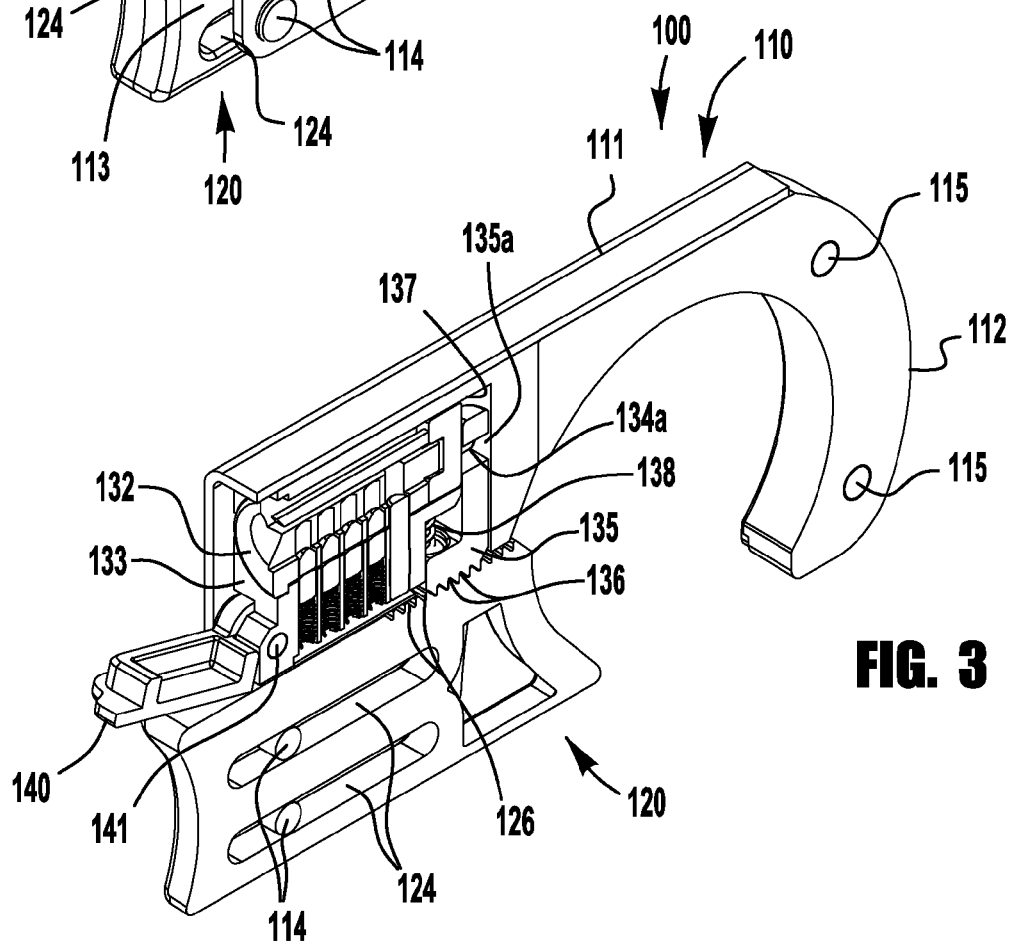
FIG. 3 is a cross-sectional side perspective view of the tailgate lock of FIG. 2.
Figure 4:
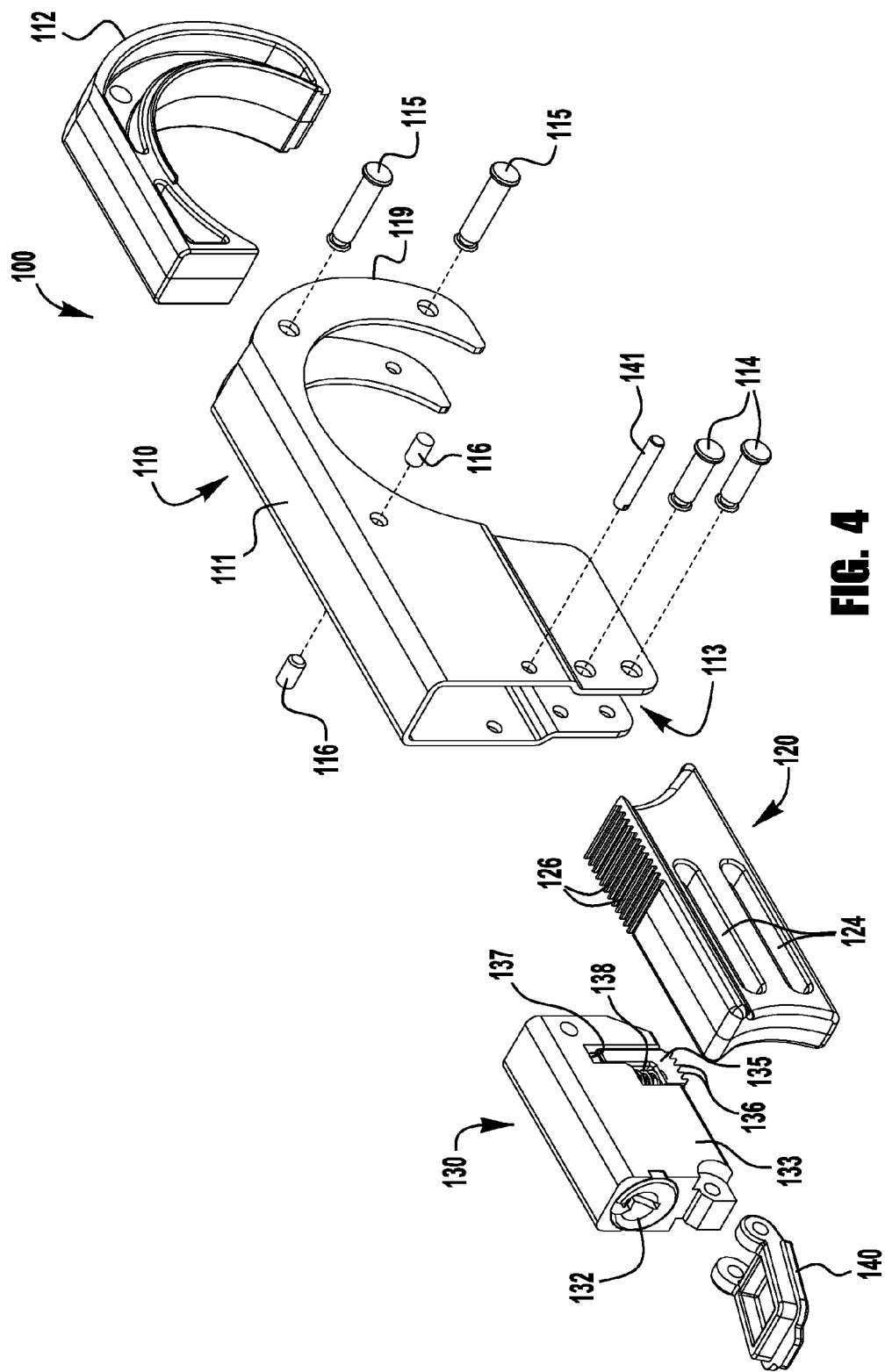
FIG. 4 is an exploded perspective view of the tailgate lock of FIG. 2.
Figure 5:
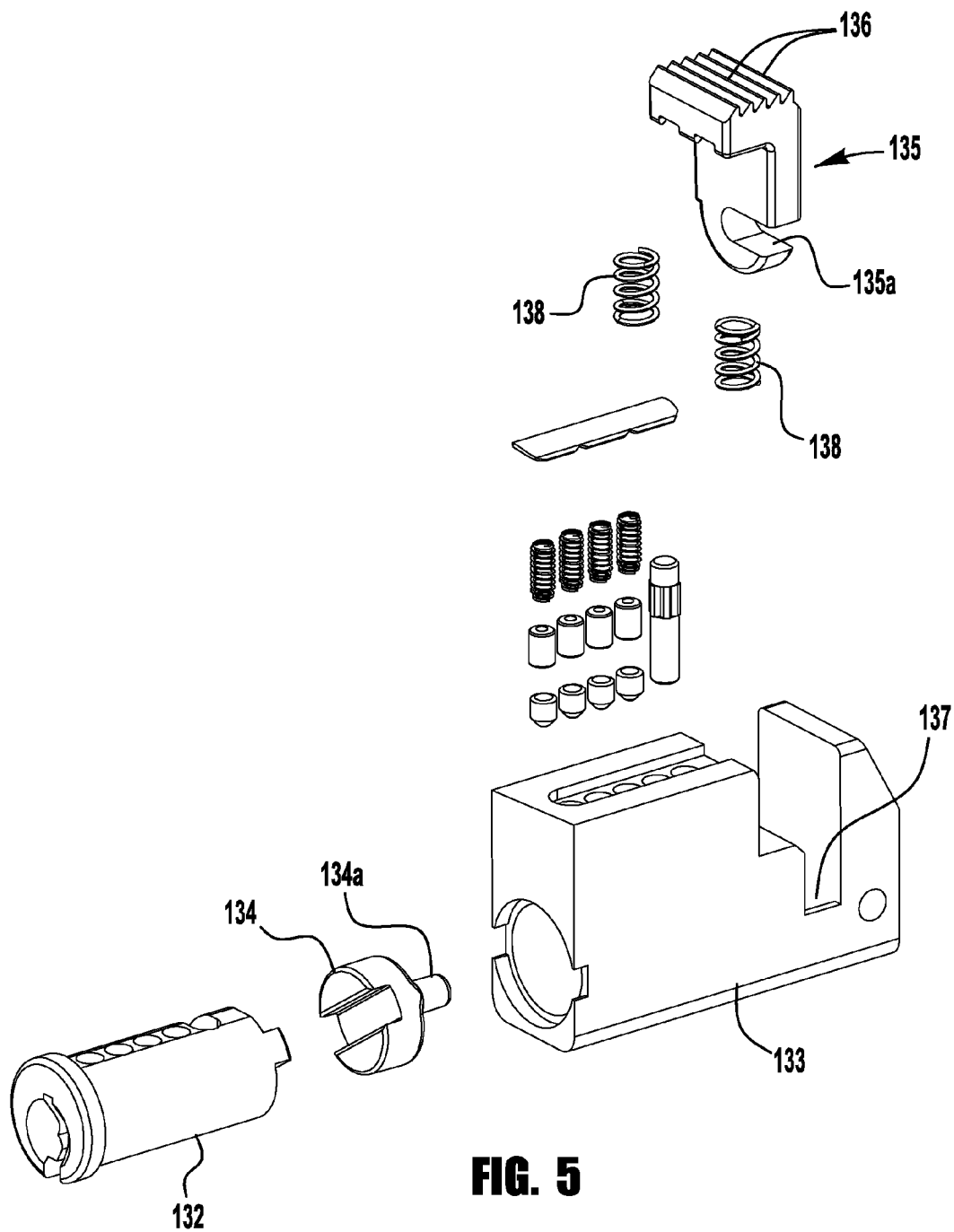
FIG. 5 is an exploded perspective view of the key cylinder lock assembly of the tailgate lock of FIG. 2.

This Detailed Description merely describes embodiments of the invention and is not intended to limit the scope of the claims in any way. Indeed, the invention as claimed is broader than and unlimited by the preferred embodiments, and the terms used in the claims have their full ordinary meaning.

Also, while the exemplary embodiments described in the specification and illustrated in the drawings relate to a tailgate lock for lockingly retaining a tailgate to a truck body, it should be understood that many of the inventive features described herein may be applied to other locking devices and arrangements, including, for example, padlocks and combination locks or other locking arrangements configured to lockingly secure two or more structures in engagement with or in proximity to each other.

The present application contemplates a tailgate lock configured to be secured around at least a portion of a slot in a hollow axle or hinge cup of a tailgate to prevent unauthorized removal of the tailgate by pulling the hollow axle off of the corresponding shaft on the truck body. In one embodiment, a tailgate lock includes a lock body shaped to hook over a tailgate axle, and sized to fit between an inner wall surface of the truck bed and an outer edge of the tailgate. A sliding lock bar (or other such locking member) is assembled with the lock body and lockable in a tailgate securing position to prevent removal of the tailgate lock from the tailgate axle, thereby preventing removal of the tailgate from the truck. In an exemplary embodiment, the lock bar is lockable in multiple tailgate securing positions, for example, to accommodate tailgate axles of varying sizes.

FIGS. 2-5 illustrate an exemplary tailgate lock 100 having a lock body 110 that retains a sliding locking member or lock bar 120 through a slot or passage 113 in a first end of the lock body 110. To secure and guide the lock bar 120 within the lock body passage 113, the lock 100 may be provided with one or more pins, rivets or other fasteners 114 secured to the lock body 110 and extending through one or more slots 124 in the lock bar 120. The lock body 110 is provided with a locking mechanism 130 assembled within the lock body to secure the lock bar 120 in one or more tailgate securing positions, and to selectively release the lock bar 120 for movement of the lock bar from one of the tailgate securing positions to a tailgate releasing position. In other embodiments (not shown), the locking mechanism may be assembled within the lock bar for locking engagement with the lock body. While many different locking mechanisms may be utilized, in the illustrated embodiment, the locking mechanism 130 includes a pin tumbler key cylinder assembly, as known in the art and illustrated in the exploded view of FIG. 5.

To facilitate use as a tailgate lock, the lock body width may be minimized so that the lock body 110 fits between an inner wall surface of the truck bed and an outer edge of the tailgate. In the illustrated embodiment, the lock body 110 is U-shaped in cross section, with a U-shaped housing 111 and a reinforcing spacer 112 secured within a hook portion 119 (or other such retaining portion) at a second end of the lock body 110 (for example, by rivets 115). The key cylinder assembly 130 includes a shell block 133 shaped to be closely received in the housing 111 and may be fastened into the body (e.g., using retaining pins 116, see FIG. 4) for further reinforcement of the housing. A keyway cover may be provided to protect the keyway from damage caused by exposure to moisture, dirt, or other contaminants. In the illustrated embodiment, a plastic or elastomeric keyway cover 140 is pivotably secured to the shell block 133 (for example, using a pin 141, see FIGS. 3 and 4) to prevent loss of the cover 140.

The housing 111 and key cylinder block 133 define the passage 113 for the lock bar 120. A distal end of the lock bar extends outward from the lock housing 111 for manipulation by a user, for example, to advance the lock bar 120 into further engagement with a tailgate axle, or to retract the lock bar for removal of the lock 100. The lock body may be adapted to pivot with the tailgate as the tailgate is moved between vertical and horizontal positions. For example, soft elastomer pads or other such gripping surfaces may be provided on the end of the lock bar 120 and/or the inner surface of the hook portion 119 to help grip the tailgate axle or hinge cup. As another example, an adhesive, fastener, or hook-and-loop pad (e.g., VELCRO®) may secure the side of the lock body 110 to the tailgate.

The key cylinder assembly 130 is configured to move a latch or ratchet member 135 out of engagement with the lock bar 120 upon insertion and rotation of an authorized key. In the exemplary embodiment, the latch member 135 is disposed in a notch 137 in the key cylinder block 133. Rotation of the key cylinder plug 132 within the block 133 rotates a keyed or connected extension 134 to engage an extension post 134a with the latch member 135 (e.g., with a notched or recessed portion 135a of the latch member). Further rotation of the key cylinder plug 132 causes the extension 134 to retract the latch member 135 against springs 138 disposed between the locking member 135 and the block notch 137, thereby disengaging the latch member 135 from the lock bar 120 for manual or spring-loaded (not shown) sliding movement of the lock bar 120 to the tailgate releasing position. While any suitable locking engagement between the latch member 135 and lock bar 120 may be employed, in the illustrated embodiment, toothed portions 126, 136 on a ratchet surface of the lock bar 120 and on the latch or ratchet member 135 provide secure gripping engagement between the lock bar and latch member. Such an arrangement also allows the lock bar 120 to be secured in a plurality of tailgate securing positions, for example, to accommodate different sized tailgate axles. In one such embodiment, the teeth 126, 136 may be angled to provide a ratcheting feature, allowing the lock bar 120 to be extended further toward the tailgate (i.e., in a ratcheting direction), but not withdrawn from the tailgate (i.e., moved in a releasing direction), when the key cylinder assembly 130 is in a ratcheting locked condition.

In one embodiment, a locking mechanism may be provided with separate positions for a fully locked condition (secured against movement of a locking member in both ratcheting and releasing directions), a ratcheting locked condition (permitting movement of the locking member in the ratcheting direction but secured against movement in the releasing direction), and an unlocked condition (permitting movement of the locking member in either direction). One example of such an arrangement is described in U.S. Pat. No. 6,393,874, the entire disclosure of which is incorporated by reference.

As shown, for example, in the illustrated embodiment, a key cylinder locking mechanism 130 may be provided with a single position (as shown in FIG. 3A) that provides a ratcheting locked condition when an authorized key is inserted in the key cylinder plug 132 and a fully locked condition when no authorized key is inserted in the key cylinder plug. The key cylinder plug 132 may be operatively secured to the ratchet member 135 (e.g., by engagement of the extension post 134a with the notched portion 135a of the latch member 135, such that when no authorized key is inserted in the key cylinder plug 132, the key cylinder plug is rotationally secured to hold the ratchet member 135 in locking engagement with the ratchet surface 126, thereby securing the locking member against movement in both ratcheting and releasing directions.

When an authorized key is inserted in the key cylinder plug 132, thus permitting rotation of the key cylinder, a force applied to the locking member in the ratcheting direction causes the ratchet member 135 to rotate the key cylinder plug 132 to a ratcheting position (see FIG. 3B), allowing the ratchet member to disengage from the ratchet surface 126 for movement of the locking member in the ratcheting direction. When the locking member has moved to another securing position, ratchet member biasing springs 138 provide a biasing force to re-engage the ratchet member 135 with the ratchet surface 126 and to rotate the key cylinder plug back to the locked position. When an authorized key is used to rotate the key cylinder plug 132 to an unlocked position (as shown in FIG. 3C), the key cylinder plug 132 moves the ratchet member 135 to a disengaged position for adjustment of the locking member in either the ratcheting or releasing directions. As shown, the ratcheting position of the key cylinder plug 132 may be rotationally between the locked and unlocked positions of the key cylinder plug. In other embodiments, the ratcheting and unlocked positions may be substantially the same rotational position, with the ratcheting position obtained by applying force to the lock member, and with the unlocked position obtained by manually turning the key cylinder plug.

In the illustrated embodiment, the ratchet member biasing springs 138 provide a biasing force to automatically re-engage the ratchet member 135 with the ratchet surface 126 and to rotate the key cylinder plug back to the locked position when the user lets go of the rotated key. In another embodiment, as shown in FIG. 3D, the key cylinder plug 232 may be configured such that the ratchet member biasing springs (not shown) are not effective to rotate the key cylinder plug out of the unlocked position, thereby allowing the key cylinder plug to remain in an unlocked position while the locking member 220 is adjusted, without holding the key cylinder plug 232 in the unlocked position. In the illustrated example, the cylinder plug extension post 234a of the unlocked lock is oriented such that the force applied by the ratchet member biasing springs (through the notched portion 235a of the ratchet member 235) is not translated to a rotational force applied to the key cylinder plug.

Other locking mechanisms may also provide for secure locking of the lock bar in multiple tailgate securing positions. For example (not shown), a locking screw thread may be used to drive the lock bar, which may allow for an increased clamping force of the tailgate lock.

To install the tailgate lock 100 onto an attached tailgate, the lock 100 is provided with the lock bar 120 in a releasing position in which a proximal end of the lock bar 120 and the lock body hook portion 119 define a gap sized to receive the hollow axle of the tailgate therethrough. The lock is aligned between the tailgate and the truck inner wall. The hook portion 119 of the lock body 110 is hooked over the tailgate axle, and the hollow axle is received through the gap. The lock bar 120 is advanced within the lock body passage 113 to a securing position proximate the hook portion 119. In this locked condition, the lock body 110 and lock bar 120 extend around a portion of the circumference sufficient to prevent removal of the lock 100 from the tailgate (e.g., greater than half the circumference of the tailgate axle), such that the hollow axle and pivot shaft are captured between the lock body 110 and the lock bar 120. The key cylinder plug is permitted or otherwise operated to return to the locked position. To remove the tailgate lock 100 from the tailgate, a proper key is inserted in the key cylinder plug 132, and the cylinder plug 132 is rotated to retract the ratchet member 135 against springs 138 to disengage the lock member teeth 136 from the ratchet surface 126. The lock bar may then be withdrawn or refracted to a tailgate releasing position to unhook the hooked portion 119 of the lock body 110 from the tailgate axle.

According to another aspect of the present application, a tailgate lock may be provided with a lock bar assembly having an adjustable length to accommodate a wider range of tailgate axle sizes while providing a tighter fit between the lock and the tailgate axle. In one embodiment, a user initially adjusts a length of the lock bar to better accommodate his or her tailgate axle (e.g., either to more easily receive the axle within the lock in the tailgate releasing position, or to more tightly retain the tailgate axle in the lock in the tailgate securing position). For continued or repeated use on the same tailgate axle, further adjustments of the lock bar length should not be necessary (but may be made as desired). While many different configurations may be utilized to provide for adjustment of the lock bar length, in one embodiment, a two piece lock bar assembly includes a lock bar body with an extension slideable on the lock bar body and securable to the lock bar body in a plurality of positions to provide for an adjustable length. To prevent improper adjustment of the lock bar length, the lock bar assembly may be configured such that the extension is secured to the lock bar body at a location that is only accessible when the tailgate lock is in the tailgate releasing position.

Figure 6A:
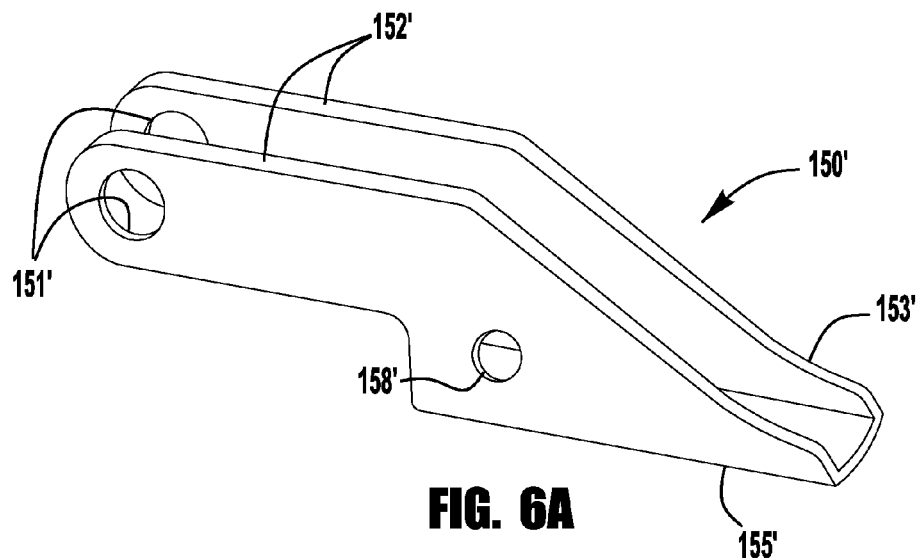
FIGS. 6A and 6B are perspective views of a lock bar extension and lock bar body for an exemplary tailgate lock.
Figure 6B:
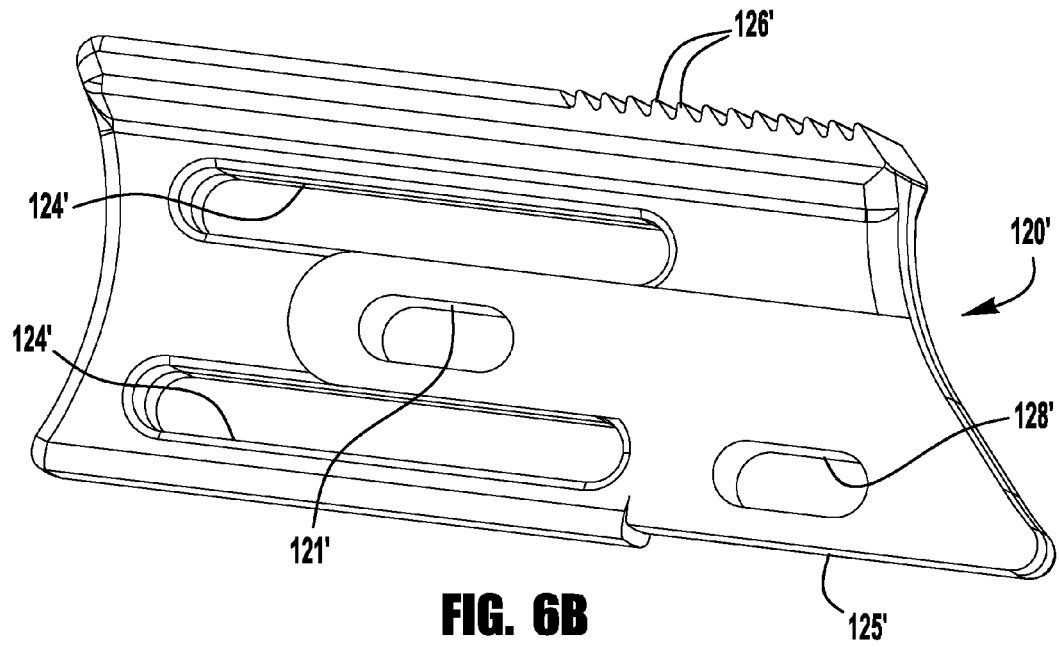
Figure 7A:
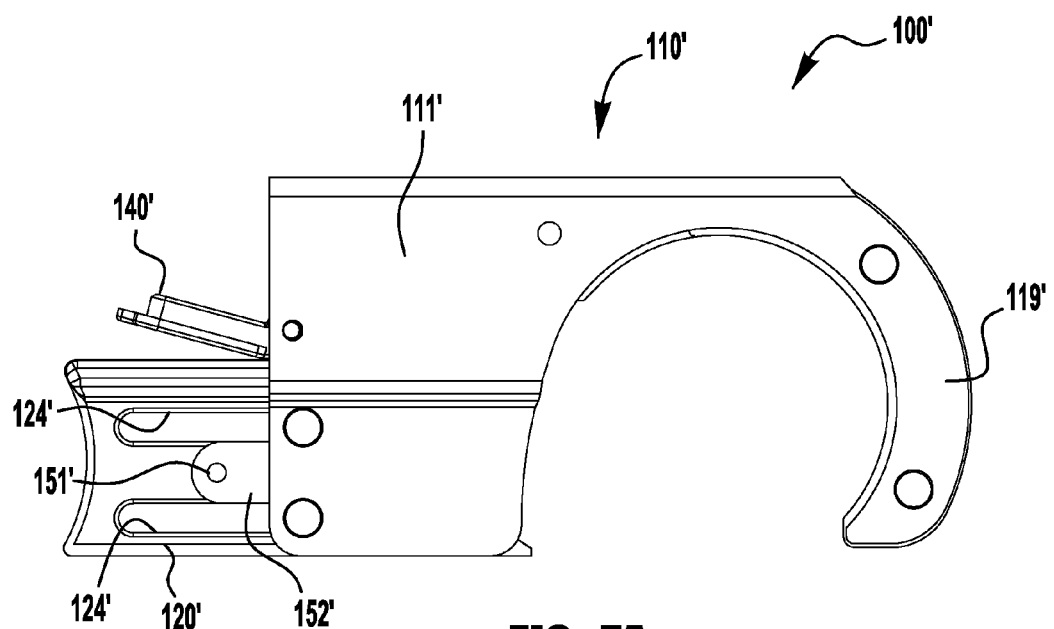
FIG. 7A is a side view of an exemplary tailgate lock using the lock bar and lock bar extension of FIGS. 6A and 6B, with the lock bar extension in an unextended condition and the tailgate lock in a tailgate releasing position.
Figure 7B:
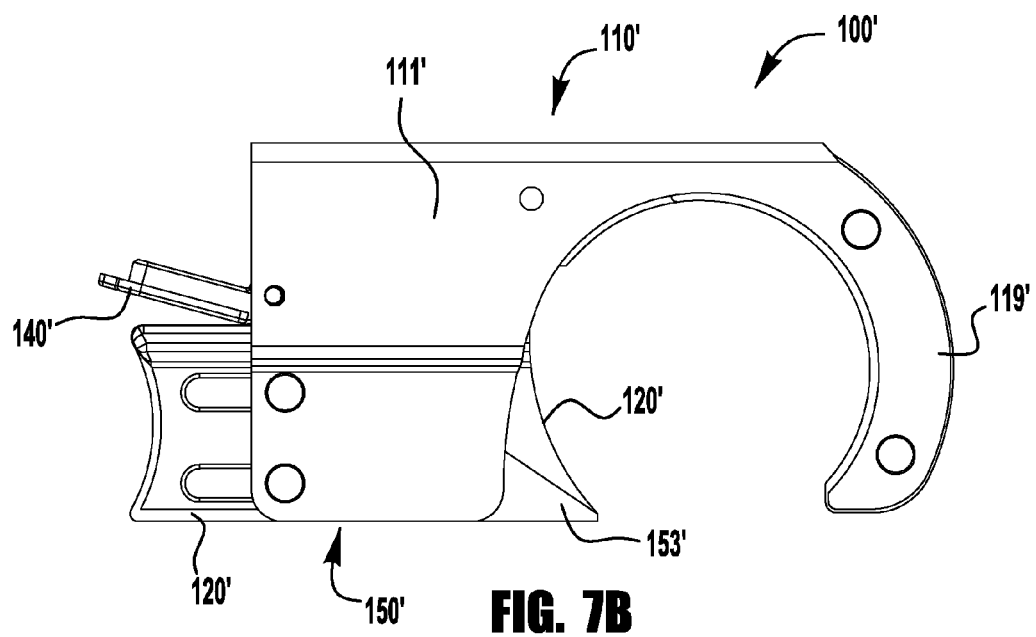
FIG. 7B is a side view of the tailgate lock of FIG. 7A, with the lock bar extension in an unextended condition and the tailgate lock in a tailgate securing position.
Figure 8A:
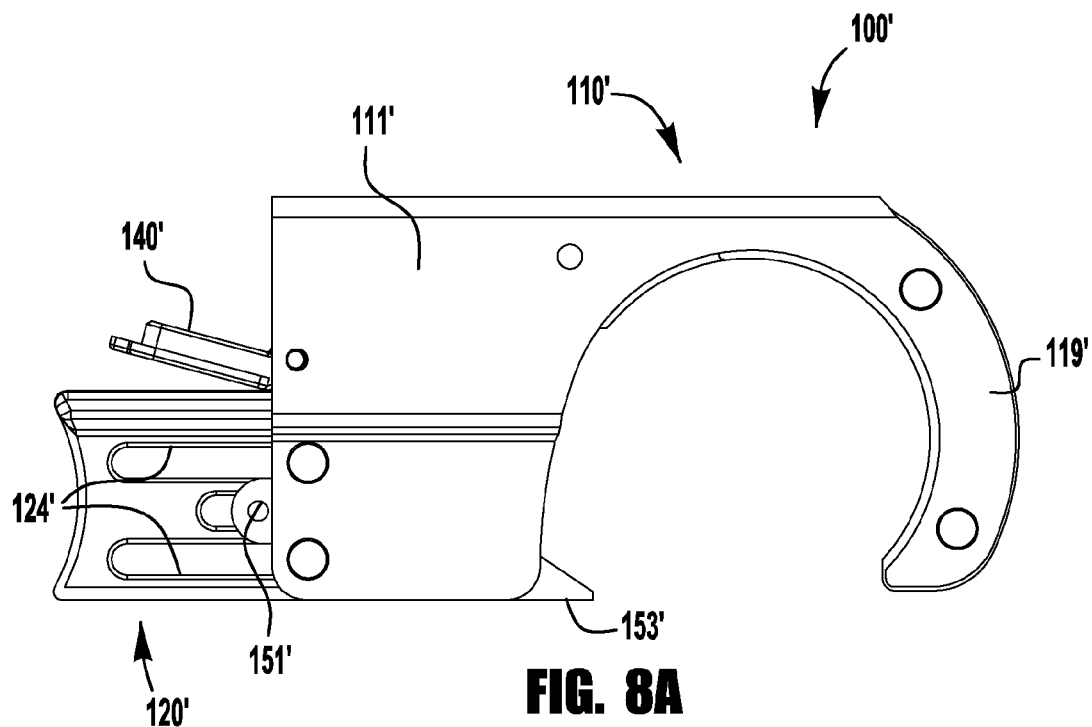
FIG. 8A is a side view of the tailgate lock of FIG. 7A, with the lock bar extension in an extended condition and the tailgate lock in a tailgate releasing position.

FIGS. 6A and 6B illustrate a lock bar body 120' and extension 150' for a tailgate lock 100', as shown in FIGS. 7A, 7B, 8A, and 8B. The exemplary extension 150' is formed as a bracket having a U-shaped cross-section, with a pair of rearward extending retaining tabs 152' and a forward extending contoured engaging portion 153'. A base portion 155' of the extension 150' is sized to closely receive a recessed bottom edge 125' of the lock bar body 120', and a guide pin (not shown) is press fit through holes 158' in the extension for sliding movement within a slot 128' in the lock bar body 120'. As such, the extension 150' is guided between a range of positions by the pin and the recessed bottom edge 125'. The extension 150' is secured to the lock bar body 120' by tightening an adjustment screw (not shown) in lock holes 151' that align with an elongated slot 121' in the lock bar body 120'. The retaining tabs 152' are sized such that the lock holes 151' are only exposed beyond the housing 111' when the lock bar body 120' is in the tailgate releasing position (as shown in FIGS. 7A and 8A). This prevents access to the adjustment screw when the lock bar body 120' is in the tailgate securing position.

Figure 8B:
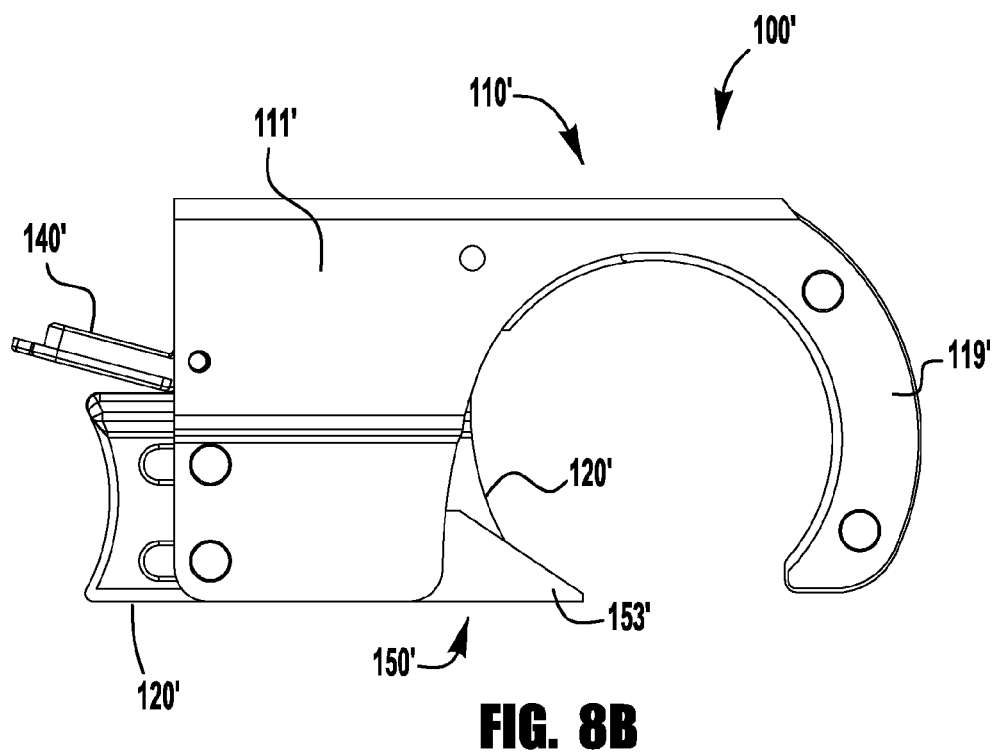
FIG. 8B is a side view of the tailgate lock of FIG. 7A, with the lock bar extension in an extended condition and the tailgate lock in a tailgate releasing position.

To secure the extension 150' in a desired position with respect to the lock bar body 120', the extension is slid into any desired position in which the lock holes 151' align with a portion of the elongated slot 121'. The adjustment screw (not shown) is inserted through the aligned lock holes 151' and slot 121', and is tightened to affix the extension 150' on the lock bar body 120' in the desired position. In the illustrated embodiment, the extension 150' does not extend beyond the lock bar body 120' when the extension is in a non-extended position, as shown in FIGS. 7A and 7B. When the extension 150' is adjusted to an extended position with respect to the lock bar body 120', as shown in FIGS. 8A and 8B, the contoured engaging portion 153' of the extension extends beyond the lock bar body 120', for example, to further encircle or constrict a smaller tailgate axle in the tailgate securing position of FIG. 8B.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and subcombinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

What is claimed is:

1. A lock comprising:
    a lock body extending in a longitudinal direction between a first end partially defining a longitudinal passage and a second end;
    a lock bar disposed within the longitudinal passage and movable in a longitudinal direction between a securing position proximal to the second end and a release position distal to the second end, with a proximal end portion of the lock bar and the second end defining a first gap when the lock bar is in the release position; and
    a locking mechanism assembled with the first end of the lock body and partially defining the longitudinal passage, the locking mechanism being operable between a locking condition securing the lock bar against movement from the securing position to the release position, and an unlocked condition permitting longitudinal movement of the lock bar relative to the locking mechanism from the securing position to the release position.

2. The lock of claim 1, wherein the locking mechanism comprises a ratchet member engageable with a ratchet surface disposed on the lock bar to secure the locking member in any one of a plurality of incremental securing positions relative to the lock body.

3. The lock of claim 2, wherein the ratchet member is biased toward a ratchet surface engaging position.

4. The lock of claim 2, wherein the locking mechanism further comprises a key cylinder rotatable between a locked position and an unlocked position when an authorized key is inserted in the key cylinder, the key cylinder moving the ratchet member out of engagement with the ratchet surface when the key cylinder is rotated to the unlocked position.

5. The lock of claim 4, wherein when the key cylinder is in the locked position and the authorized key is inserted in the key cylinder, a force applied to the locking member in a first direction rotates the key cylinder to a ratcheting position between the locked position and the unlocked position to disengage the ratchet member from the ratchet surface to permit movement of the locking member in the first direction, with the locking member remaining secured against user movement in a second direction opposite the first direction.

6. The lock of claim 4, wherein the key cylinder comprises an extension engaged with the ratchet member, such that when the key cylinder is secured against rotation, the ratchet member is held by the extension in engagement with the ratchet surface.

7. The lock of claim 1, wherein the proximal end portion of the lock bar and the second end define a second gap when the lock bar is in the securing position, the second gap being smaller than the first gap.

8. The lock of claim 1, wherein the lock bar comprises a body and a bracket secured to the body to define the proximal end portion of the lock bar, the bracket being adjustable on the body to adjust the position of the proximal end portion with respect to the second end of the lock body.

9. The lock of claim 1, wherein a distal end of the lock bar opposite the proximal end extends beyond the first end of the lock body for user manipulation of the lock bar.

10. A method of securing a tailgate to a pivot shaft extending from an inner wall of a pickup truck, the tailgate including a hollow axle receiving the pivot shaft through a slot in the hollow axle when the tailgate is pivoted to a removal orientation, the method comprising:
    providing a lock, including a lock body having a retaining portion, a lock bar slideably disposed within a passage partially defined by the lock body, and partially defined by a locking mechanism assembled with the lock body, with the lock bar being in a releasing position in which a proximal end of the lock bar and the lock body retaining portion define a first gap sized to receive the hollow axle therethrough;
    aligning the lock between the tailgate and the pickup truck inner wall;
    receiving the hollow axle through the first gap;
    sliding the lock bar in a longitudinal direction relative to the locking mechanism to a securing position proximate the retaining portion, such that the hollow axle and pivot shaft are captured between the lock body and the lock bar; and
    operating the locking mechanism to secure the lock bar in the securing position.

11. The method of claim 10, wherein when the lock bar is slid to the securing position, the proximal end of the lock bar and the retaining portion define a second gap smaller than a diameter of the hollow axle.

12. The method of claim 10, wherein the lock bar comprises a body and a bracket secured to the body to define the proximal end portion of the lock bar, the method further comprising adjusting a position of the bracket on the body to adjust the position of the proximal end portion with respect to the retaining portion.

13. The method of claim 10, wherein sliding the lock bar to the securing position comprises pressing a distal end of the lock bar extending outward of the lock body.

14. The method of claim 10, further comprising disengaging a ratchet member of the locking mechanism from a ratchet surface of the lock bar to permit sliding movement of the lock bar.

15. The method of claim 14, wherein the locking mechanism further comprises a key cylinder including an extension engaged with the ratchet member, such that when the key cylinder is secured against rotation, the ratchet member is held by the extension in engagement with the ratchet surface, the method further comprising inserting an authorized key in the key cylinder to permit sliding movement of the lock bar.

16. A ratcheting lock comprising:
   a lock body;
   a locking member slideably disposed in a passage in the lock body for sliding axial movement in opposed first and second directions; and
   a locking mechanism disposed within one of the lock body and the locking member and including a ratchet member engageable with a ratchet surface disposed on the other of the lock body and the locking member to secure the locking member in any one of a plurality of incremental securing positions relative to the lock body, the locking mechanism further including a key cylinder rotatable between a locked position and an unlocked position when an authorized key is inserted in the key cylinder, the key cylinder moving the ratchet member out of engagement with the ratchet surface when the key cylinder is rotated to the unlocked position;
   wherein when the key cylinder is in the locked position and an authorized key is inserted in the key cylinder, a force applied to the locking member in the first direction rotates the key cylinder to a ratcheting position between the locked position and the unlocked position to disengage the ratchet member from the ratchet surface to permit sliding axial movement of the locking member in the first direction, with the locking member remaining secured against user movement in the second direction.

17. The ratcheting lock of claim 16, wherein the locking mechanism is disposed within the lock body and the ratchet surface is disposed on the locking member.

18. The ratcheting lock of claim 16, wherein the key cylinder comprises an extension engaged with the ratchet member, such that when the key cylinder is secured against rotation, the ratchet member is held by the extension in engagement with the ratchet surface.

19. The ratcheting lock of claim 16, wherein the ratchet member is biased toward a ratchet surface engaging position by a biasing force sufficient to rotate the key cylinder from the ratcheting position to the locked position.

* * * * *